J. H. CLAPPISON.
DISPENSING DEVICE FOR NUT MEATS.
APPLICATION FILED OCT. 17, 1919.
1,337,440.
Patented Apr. 20, 1920.
2 SHEETS—SHEET 2.
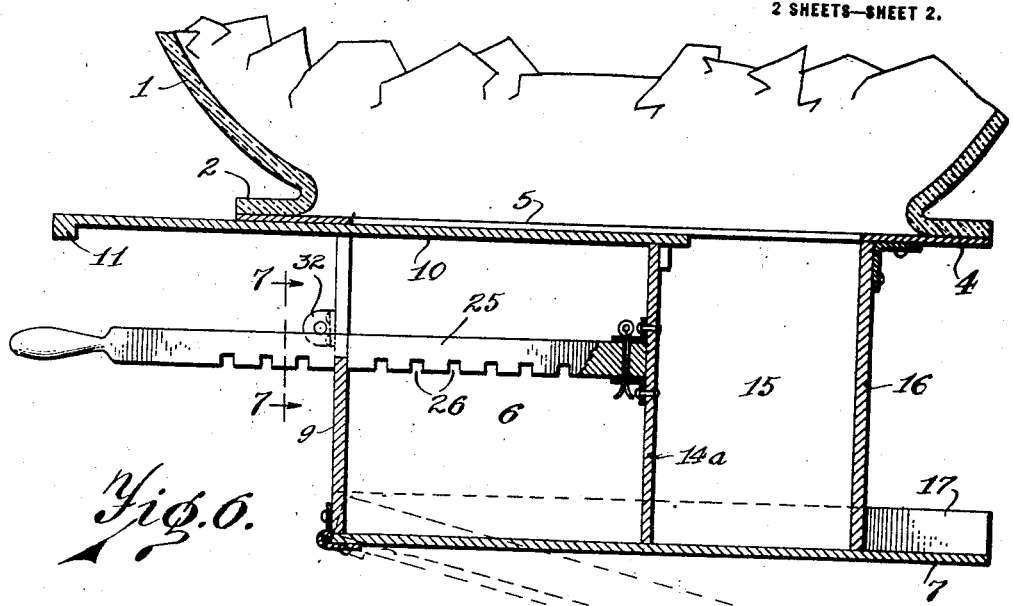
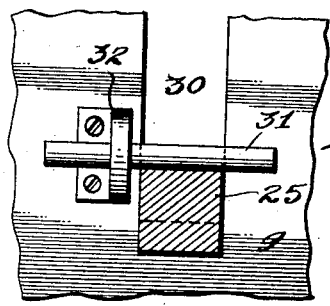
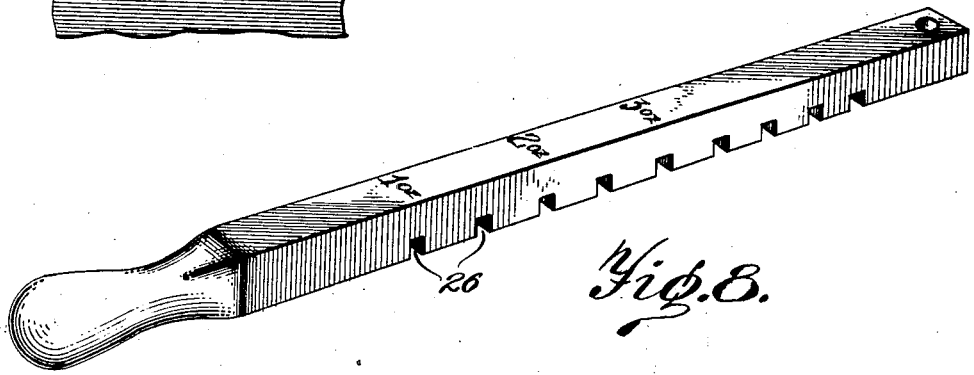
Inventor
JOHN H. CLAPPISON.
By Charles E. Wixon
Attorney

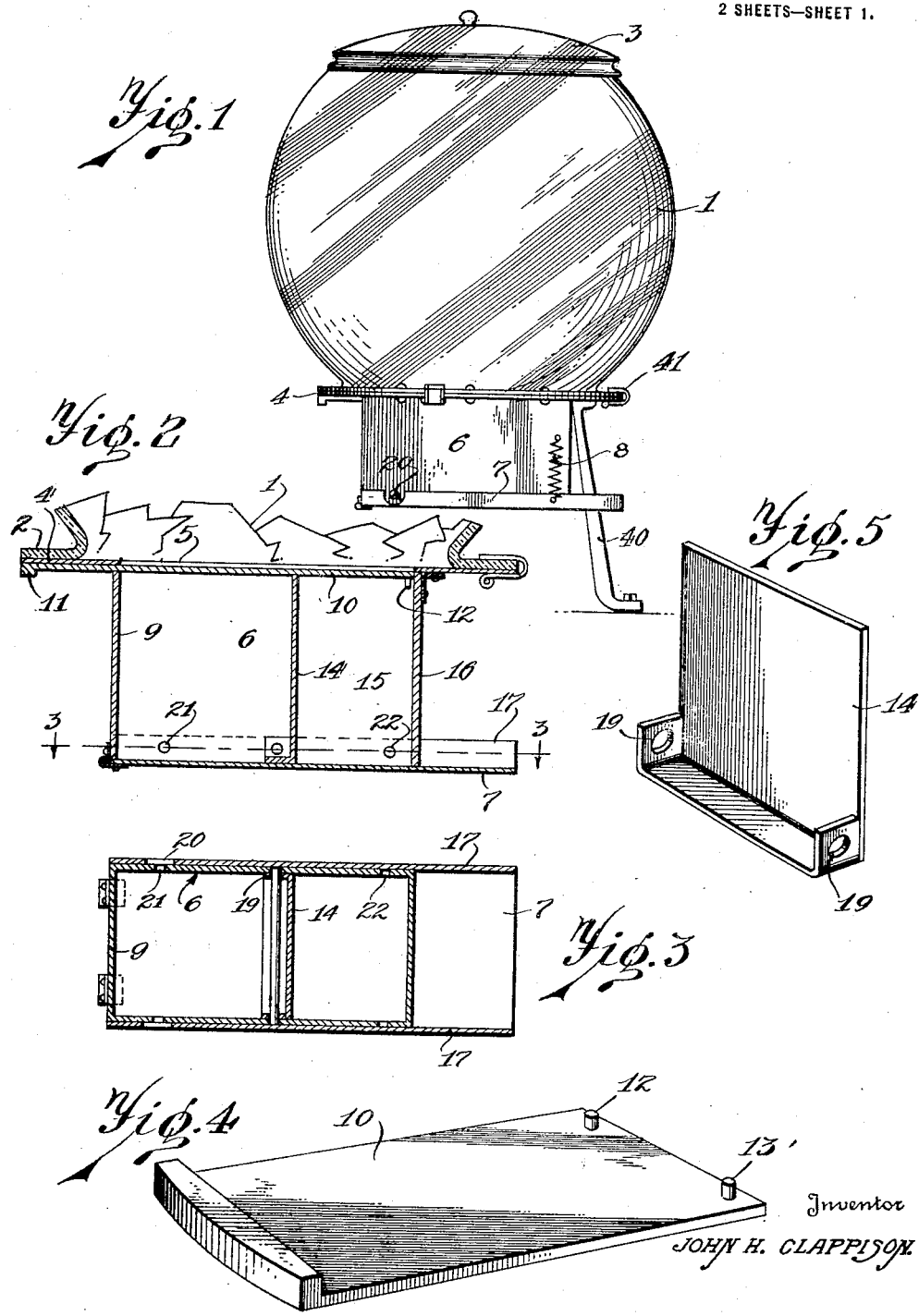

UNITED STATES PATENT OFFICE.

JOHN H. CLAPPISON, OF DETROIT, MICHIGAN.

DISPENSING DEVICE FOR NUT-MEATS.

1,337,440.  Specification of Letters Patent.  Patented Apr. 20, 1920.

Application filed October 17, 1919. Serial No. 331,360.

*To all whom it may concern:*

Be it known that I, JOHN H. CLAPPISON, a citizen of the United States, residing at Detroit, county of Wayne, State of Michigan, have invented a certain new and useful Improvement in Dispensing Devices for Nut-Meats, and declare the following to be a full, clear, and exact description of the same, such as will enable others skilled in the art to which it pertains to make and use the same, reference being had to the accompanying drawings, which form a part of this specification.

This invention relates to dispensing devices for nut meats, candies and other confections, and its object is to provide a dispensing device of a character to hold a quantity of material to be dispensed provided with means to measure out various quantities of goods as may be desired and by operation to discharge the same into the package or wrapper therefor.

Heretofore with nut meats and other goods of the same general character as candies, etc., are dispensed from glass jars usually sitting on the counter by means of a measure which the attendant fills by dipping into the container. It is desirable that these containers be maintained nearly full inasmuch as the practically filled containers present a much more desirable appearance in display on a counter and thus when a container has been about half emptied it is usually again filled and as the measure is introduced into the top of the container the goods remaining in the bottom become stale and valueless. This invention seeks to provide a dispensing device for use in conjunction with a container whereby the dispensing is from the bottom of the container and the filling of the container is through the top. Thus fresh goods are always maintained in the container. A further object of the invention is to provide a dispensing device of a character adapted to be regulated as to the quantity dispensed whereby the apparatus is adapted to be utilized with containers for various classes of goods in which different amounts are sold for a stated sum. That is—with nut meats a certain quantity is sold for the sum of ten cents. With some grades of candies a considerably larger quantity may be sold for the same amount. This invention seeks to provide a dispensing device adapted to be readily adjusted whereby this quantity may be discharged at each operation. A further feature of the invention is to provide a device which may be detachably secured to a glass container and these objects and the several novel features of the invention are hereinafter more fully described and claimed and the preferred form of the invention is shown in the accompanying drawings in which—

Figure 1 is an elevation of my improved dispensing device.

Fig. 2 is a vertical section through the dispensing apparatus.

Fig. 3 is a section taken on line 3—3 of Fig. 2.

Fig. 4 is a perspective view of the slide utilized in filling the container portion of the device.

Fig. 5 is a perspective view of the wall adjustable in position to provide a chamber of various cubical contents.

Fig. 6 is a vertical section showing the dispensing device including a different means for adjusting the wall of the dispensing chamber.

Fig. 7 is an end view showing the adjusting rod or member in section.

Fig. 8 is a perspective view of the rod connected to the adjustable wall and projecting through the wall of the device whereby the adjustable wall is positioned as may be desired.

The device consists of an ordinary glass container 1 which may be of any desired shape and preferably provided with a flange 2 about an opening provided at the bottom. This container is preferably provided with an opening at the top and for this top opening is provided a cover member 3 of any approved type through which the container may be filled. The dispensing device is preferably formed of metal and has a flanged member or plate 4 at the upper side corresponding in shape to the shape of the flange 2 of the container and this plate member 4 has a rectangular opening 5 therein as will be understood from Fig. 2. This plate 4 has secured to or integrally formed therewith a rectangular box like member 6 open at the bottom having a hinged cover 7 therefor held against the said bottom by means of springs 8 on opposite sides of the box 6. Just beneath the plate 4 and extending through the slot in the wall 9 of the box 6 is a slide 10 extending outwardly at the rear beneath the flange 2 and plate 4 and provided with a handhold 11 of any approved form. This slide is provided preferably with two pins 12 and 13 at the forward end thereof extending downwardly into the box like member as shown in Fig. 2. Within the box like member is a movable wall 14 dividing the said member into two compartments.

When the slide is positioned as shown in Fig. 2, both the compartments are closed to the container but, by moving the slide 10 to the left of the position shown in Fig. 2 to the position shown in Fig. 6, the forward compartment 15 of the device is open to the container which becomes filled with the material in the container and the position of this wall member 14 as shown in Fig. 2 or 14$^a$ shown in Fig. 6 relative to the forward end wall 16 of the box determines the amount of material to be dispensed. When the slide has been pulled as shown in Fig. 6 and thereafter returned to original position as indicated in Fig. 2 the flanged cover member 7 may be depressed at the forward end allowing the material to discharge by gravity from the chamber 15 into a sack or other container held at the end of the cover member 7. This cover member is preferably provided with the side flanges 17 on opposite sides thereof forming a trough shaped member of a character to guide the material directly into the package or container held at the forward end thereof. After the material has been discharged from the chamber 15 the cover is released to action by the springs 8 which hold the same in position shown in Fig. 2 whereupon the chamber may be again filled and discharged in like manner.

The wall 14 shown in Fig. 2 and in Fig. 5 may be set at various distances from the wall 16 of the box and for this purpose it may be provided with the upturned lugs 19 on opposite sides which are threaded to receive the screw 20 shown in Fig. 1 passing through the outer side wall of the box 6. These side walls are provided with a series of apertures 21 and 22 to enable this wall to be positioned the required distance from the wall 16 depending upon the quantity desired to be dispensed at each operation of the slide 10. It is to be noted that this slide 10 by means of the pins 12 and 13 or other means may be prevented from being moved to open the container to the second chamber of the box, and that by this arrangement irrespective of where the adjustable wall may be positioned the slide is always limited in its movement by the wall 14 so that only the forward chamber 15 of the box is opened to the container.

The structure above described is particularly useful where a fixed quantity is continuously dispensed from a container. In the event of use of the device where the goods to be dispensed are bought in various quantities a different character of adjustment of the wall may be provided as is suggested in Fig. 6. In this case the wall member 14$^a$ has connected thereto a handle member or rod 25 preferably square in cross section and provided with a series of notches 26 in the lower edge thereof, and these notches may be arranged and indications made on the upper side of the rod relative to the notches so that any predetermined notch set to engage the end wall 9 will position the wall 14$^a$ and dispense a definite quantity of material which will be understood from Fig. 8. The end wall 9 of the box has a slot 30 therein in which the member 25 may be reciprocated as required in positioning of the adjustable wall 14$^a$, and the notches are designed to engage over the member 9 at the bottom of the slot as will be understood from Fig. 7. To prevent accidental displacement of the bar 25 a pin 31 is utilized extending over the top of the bar when in position and carried in a lug 32 secured to the end wall.

The plate 4 may have three or more legs 40 secured thereto as suggested in Fig. 1 in which only one of such legs is shown, and the plate 4 may be attached to the flange 2 of the container which is preferably of glass by means of clips 41 secured to the plate and adapted to be forced over the peripheral edge of the plate and flange of the container as will be understood from Fig. 1. The plate and flange, however, may be fixedly secured together if desired.

The principal features of the invention reside in the division of a container having the two open ends, the upper one provided with a cover and the lower one provided with the dispensing device secured thereto. By this arrangement the goods dispensed are drawn from the bottom of the container and the new goods may be placed in the top of the container. Therefore, no goods may remain in the container for so long a period as to become stale as with the usual glass containers with the top only open to receive or dispense the goods. By providing an adjustable member 14 or 14$^a$ and a slide member limited in its movement by the positioning of the member 14 or 14$^a$ a definite quantity only may be dispensed at a time and the desired quantity to be dispensed may be determined upon by the positioning of the adjustable wall.

Having thus fully described my invention, what I claim and desire to secure by Letters Patent of the United States is—

1. A dispensing apparatus comprising a container open at the top and bottom and a dispensing device secured to the bottom consisting of an apertured plate and box like member the perimeter of which is equal to the perimeter of the aperture, an adjustable dividing wall in the box separating the same into compartments and a slide between the box and plate for closing the aperture adapted to be manually operated and limited in its extent of opening movement by the dividing wall, and a spring-restrained cover member at the bottom providing a means for holding the material in the box during the filling thereof.

2. A dispensing device comprising a container open at the top and bottom, an apertured plate secured to the said bottom, a depending box like member having an area in cross section similar to that of the aperture and having an open lower end, a cover member hinged to the bottom at one end, springs yieldably holding the cover closed, an adjustable wall dividing the box like member into compartments, and a slide for closing the said aperture limited in its opening movement by the said adjustable wall.

3. In a dispensing device consisting of a container having an open lower end, a plate providing a closure therefor and having a rectangular aperture therein, a slide for closing the said aperture, a depending rectangular shaped portion open at the lower end, a cover hinged at one end of the depending portion, a dividing wall adjustable in position relative to an end wall of the said box, the inner end of the slide having a projection extending into the compartment between the adjustable wall and end wall of the depending portion preventing the withdrawal of the slide beyond the adjustable wall.

4. A dispensing device comprising the combination with an open-ended container, of an apertured plate secured to the said open end and provided with a depending open-ended tubular member, a hinged cover for the said lower open end of the tubular portion, the cover member being of a length greater than the breadth of the tubular portion, a spring for holding the said cover member in closed relation with the tubular portion, an adjustable wall separating the tubular member into compartments, and a slide for covering the aperture of the plate, the slide being limited in its opening movement by the said adjustable wall.

5. A dispensing device comprising the combination with an open-ended container, of a plate secured to the said open end and a rectangular aperture therein, a rectangular tubular depending portion having a cross sectional area substantially equal to that of the aperture, a slide providing a closure for the said aperture, a spring-retracted cover hinged to the lower open end of the extension, said cover member having upwardly extending flanges on each side of the extension and providing a conduit for discharge of the material from the extension, an adjustable dividing wall, the said slide member being limited in its opening movement by the said adjustable wall, and means for adjusting the position of the wall consisting of a bar or rod extending rearwardly through the end wall of the said extension, the bar having notches therein to engage over the edge of said wall, said notches having indications positioned relative thereto to indicate the cubical contents of the chamber formed between the adjustable wall and opposite end of the extension, and means for holding the bar in its adjustable position.

6. A dispensing device comprising the combination with a container open at both ends, a cover for the upper of said ends, a plate secured to the said lower end, supporting legs attached to the plate, the plate being provided with a rectangular aperture and a depending rectangular extension having an open lower end, a spring-retracted cover member hinged to one side of the extension at the lower end providing a yieldable closure for the said extension, an adjustable wall dividing the extension into compartments, a slide providing a closure for the said aperture, means whereby the slide is limited in its opening movement by the position of the wall, and means for securing the said adjustable wall in its adjusted position.

In testimony whereof I sign this specification.

JOHN H. CLAPPISON.